Patented Mar. 30, 1937

2,075,076

UNITED STATES PATENT OFFICE 2,075,076

MONOAZODYESTUFFS

Paul Zervas, Cologne-Mulheim, and Heinrich Clingestein, Cologne-on-the-Rhine, Germany, assignors to General Aniline Works, Inc., New York, N. Y., a corporation of Delaware No Drawing. Application February 11, 1935, Serial No. 6,090. In Germany February 24, 1934

4 Claims. (Cl. 260—92)

The present invention relates to new monoazodyestuffs, more particularly it relates to azodyestuffs which may be represented by the general formula:

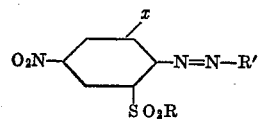

wherein $x$ stands for a non-acid substituent, such as alkyl; aralkyl; aryl; an etherified hydroxy group, for instance, alkoxy, aralkoxy and aryloxy; R stands for alkyl, aryl, aralkyl, alkoxy, aryloxy or aralkoxy, or the amino group, in which amino group the hydrogen atoms may partially or wholly be substituted by alkyl, aryl or aralkyl, and R' stands for the radical of a 2-aminonaphthalenesulfonic acid including a 2-amino-naphthalene sulfonic acid, 2-amino-8-hydroxynaphthalene-6-sulfonic acid and N-alkyl and N-hydroxy-alkyl substitution products thereof which has been coupled in an acid medium.

Our new dyestuffs are obtainable by diazotizing in the usual manner with sodium nitrite and hydrochloric acid an amine of the general formula:

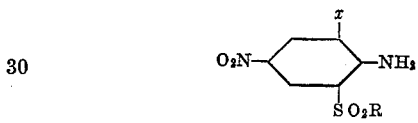

wherein $x$ and R mean the same as stated above, and coupling in an acid medium with a 2-aminonaphthalene-sulfonic acid or a substitution product thereof.

The new dyestuffs generally dye wool even violet to blue shades of good fastness to fulling, and the dyeings obtained can be distinguished by a good evening color.

The invention is illustrated by the following examples, without being limited thereto:

*Example 1.*—351 parts by weight of 5-nitro-2-amino-1-methoxy-benzene-3-sulfoethylanilide are diazotized with 69 parts by weight of sodium nitrite and hydrochloric acid. The diazo solution is introduced into an acetic acid solution of 239 parts by weight of 2-amino-8-hydroxynaphthalene-6-sulfonic acid, and the reaction acid to Congo is neutralized with sodium acetate. The isolated dyestuff having in the free state the following formula:

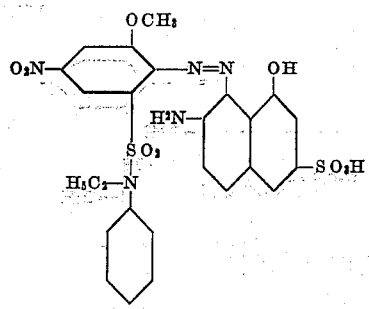

has good equalizing properties and dyes wool from an acid bath clear blue shades which do not change in artificial light. The dyeings are further distinguished by a good fastness to fulling.

*Example 2.*—351 parts by weight of 5-nitro-2-amino-1-methoxy-benzene-3-sulfoethylanilide are diazotized with 69 parts by weight of sodium nitrite and hydrochloric acid and coupled in an acetic acid medium with 253 parts by weight of 2-methyl-amino-8-hydroxynaphthalene-6-sulfonic acid. The isolated dyestuff having in the free state the following formula:

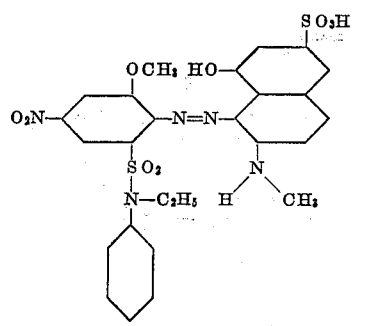

dyes wool from an acid bath clear greenish-blue shades of excellent evening color.

*Example 3.*—324 parts by weight of 5-nitro-2-amino-1-methoxy-benzene-3-sulfonic acid-phenyl ester are diotized with 69 parts by weight of sodium nitrite and hydrochloric acid and coupled in an acetic acid medium with 239 parts by weight of 2-amino-8-hydroxynaphthalene-6-sulfonic acid. The isolated dyestuff having in the free state the following formula:

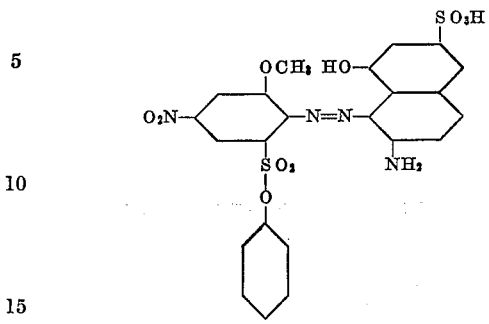

dyes wool from an acid bath greenish-blue shades.

In the following table there are given further combinations prepared in accordance with the directions given in Example 3 and the shades obtained on wool:

| Diazotized | Coupled in an acid medium with— | Shade on wool |
|---|---|---|
| 5 - nitro - 2 - amino - 1 - methoxybenzene-3-sulfonic acid-benzyl ester. | 2 - amino - 8 - hydroxynaphthalene - 6 - sulfonic acid. | Greenish-blue. |
| 5 - nitro - 2 - amino - 1 - methylbenzene - 3 - sulfoethylphenylamide. | ___do___ | Reddish-violet. |
| Do___ | 2 - methylamino - 8 - hydroxy - naphthalene - 6 - sulfonic acid. | Bluish-violet. |
| Do___ | 2 - methylamino-naphthalene - 7 - sulfonic acid. | Violet. |
| 5 - nitro - 2 - amino - 1 - methylbenzene - 3 - sulfoethylbenzylamide. | 2 - amino - 8 - hydroxynaphthalene - 6 - sulfonic acid. | Reddish-violet. |
| 2 - amino - 3 - methoxy - 5 - nitrophenylmethyl-sulfone. | ___do___ | Reddish-blue. |
| 2 - amino - 3 - methoxy - 5 - nitrophenylbenzyl-sulfone. | ___do___ | Blue. |
| 5 - nitro - 2 - amino - 1 - methoxybenzene-3-sulfamide. | ___do___ | Reddish-blue. |
| 5 - nitro - 2 - amino - 1 - methoxybenzene - 3 - sulfoethylphenylamide. | 2 - hydroxyethylamino - 8 - hydroxynaphthalene - 6 - sulfonic acid. | Greenish-blue. |
| 5 - nitro - 2 - amino - 1 - methoxybenzene - 3 - sulfo - hydroxyethylphenylamide. | 2 - methylamino-8-hydroxynaphthalene - 6 - sulfonic acid. | Do. |
| Do___ | 2 - amino - 8 - hydroxynaphthalene - 6 - sulfonic acid. | Blue. |
| 5 - nitro - 2 - amino - 1 - methoxybenzene-3-sulfonic acid-methylester. | ___do___ | Do. |

We claim:

1. Azodyestuffs of the general formula:

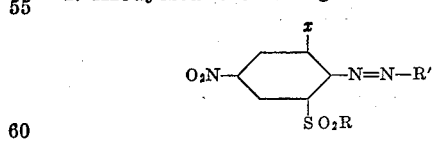

wherein $x$ stands for an etherified hydroxy group, R stands for a substituent selected from the group consisting of alkyl, aryl, aralkyl, alkoxy, aryloxy, aralkoxy, amino and alkyl-, aryl- and aralkyl-amino groups, and R' stands for the radical of a 2-amino-napthalene sulfonic acid which has been coupled in an acid medium, dyeing wool generally even violet to blue shades of good fastness to fulling.

2. Azodyestuffs of the general formula:

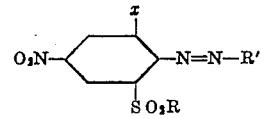

wherein $x$ stands for an etherified hydroxy group, R stands for a substituent selected from the group consisting of alkyl, aryl, aralkyl, alkoxy, aryloxy, aralkoxy, amino and alkyl- aryl- and aralkyl-amino groups, and R' stands for the radical of a coupling component selected from the group consisting of 2-aminonaphthalene-sulfonic acid, 2-amino-8-hydroxynaphthalene-6-sulfonic acid and N-alkyl and N-hydroxyalkyl substitution products thereof which has been coupled in an acid medium, dyeing wool generally even violet to blue shades of good fastness to fulling.

3. The azodyestuff of the following formula:

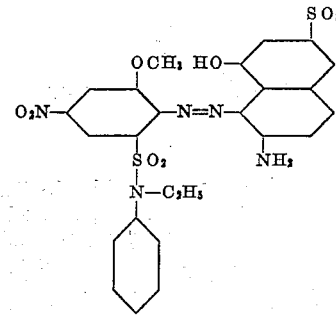

dyeing wool from an acid bath clear blue shades which do not change in artificial light and which are fast to fulling.

4. The azodyestuff of the following formula:

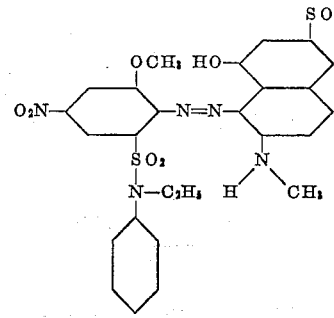

dyeing wool from an acid bath clear greenish-blue shades of excellent evening color.

PAUL ZERVAS.
HEINRICH CLINGESTEIN.